United States Patent [19]

Garrison

[11] Patent Number: 5,356,978
[45] Date of Patent: Oct. 18, 1994

[54] METHOD OF DISPERSING A TACKY ADDITIVE IN A SOLUTION OF A POLYMER

[75] Inventor: Philip J. Garrison, Houston, Tex.

[73] Assignee: Occidential Chemical Corporation, Niagara Falls, N.Y.

[21] Appl. No.: 125,721

[22] Filed: Sep. 24, 1993

[51] Int. Cl.$^5$ ............ C08K 5/04; C08K 5/09; C08K 5/34
[52] U.S. Cl. ............ 524/400; 524/100; 523/333
[58] Field of Search ............ 523/333; 524/400, 100

[56] References Cited

U.S. PATENT DOCUMENTS 3,471,427 10/1969 Dickson ............ 524/400
4,344,876 8/1982 Berner ............ 524/91

FOREIGN PATENT DOCUMENTS 0488984 6/1992 European Pat. Off. ............ 523/333

*Primary Examiner*—Paul R. Michl
*Assistant Examiner*—LaVonda R. DeWitt
*Attorney, Agent, or Firm*—Wayne A. Jones; Richard D. Fuerle

[57] ABSTRACT

Disclosed is a method of dispersing a tacky additive in a solution of a polymer, particularly a polyolefin. A dispersion composition prepared by adding the additive to a slurry of a non-polar solvent and an insoluble, infusible, non-reactive dispersant is added to the polymer solution. This prevents the additive from sticking to the vessel walls and the impeller or agglomerating.

20 Claims, No Drawings

METHOD OF DISPERSING A TACKY ADDITIVE IN A SOLUTION OF A POLYMER

BACKGROUND OF THE INVENTION

This invention relates to a method of dispersing a tacky additive into a solution of a polymer, particularly a polyalphaolefin. In particular, it relates to the addition of the additive to a slurry comprised of a non-polar solvent and an insoluble, infusible, non-reactive dispersant, followed by the addition of the resultant slurry to a separate polymer solution.

Polyethylene can be produced by a gas phase process, a slurry process, or a solution process. In a gas phase process, the polymerization is conducted in the absence of any solvent. In a slurry process, polymerization takes place in a diluent at a temperature below the melting point of the polymer, producing solid polymer particles suspended in the diluent.

In a solution process for preparing polyethylene, polymerization of ethylene takes place in a non-polar solvent above the melting point of the polymer, producing a solution of the polymer. The polymer is recovered by evaporating the solvent and unreacted monomer. A solution process permits a shorter transition time between products which reduces the cost of changing product and permits a broader line of products to be produced. Also, in a solution process, products can be produced with a lower molecular weight and a lower density than can be obtained with a slurry process.

Various additives can be added to the polymer solution prior to separation of the polymer from the solvent to prevent degradation of the polymer during processing and/or during use by the consumer. For example, UV light stabilizers can be added to prevent the finished part from being rapidly degraded by ultraviolet light. In the solution process, all of these additives must be either dissolved in a suitable solvent or finely suspended in a solvent prior to their injection into the solution of the polymer.

However, certain additives (herein referred to as "tacky additives") are not soluble in a suitable solvent nor are they entirely insoluble in the solvent. Instead, they become soft and sticky when contacted by the solvent even though these additives exist as free flowing particles in a dry form. These tacky additives adhere to the walls of the vessel, to the impeller and to themselves, producing large elastic spheres which plug up the additive nozzle. As a result, the additive is not incorporated into the polymer stream. This results in a polymer which does not meet specifications since it does not contain the desired level of additive. Furthermore, the vessel must be shut down and cleaned periodically, which is a difficult and time-consuming process.

SUMMARY OF THE INVENTION

I have discovered that an additive that is insoluble in the non-polar solvent used for the polyalphaolefin, yet becomes soft and tacky in it, can be dispersed so that it will not stick to the equipment or agglomerate if a separate dispersion composition is prepared of the additive, the solvent, and an insoluble, infusible, non-reactive dispersant, provided the additive is not added to the solvent prior to the addition of the dispersant. The dispersion composition containing the additive is then added to the solution of the polyalphaolefin. I have found that if the additive is added to the solvent of the dispersion composition prior to the addition of the dispersant, the dispersant is not effective and agglomeration of the additive still occurs.

DESCRIPTION OF THE INVENTION

In the process of this invention, a dispersion composition is prepared by suspending the additives in a non-polar solvent. This dispersion is then added to a solution of a polymer, particularly a polyalphaolefin, preferably polyethylene, although it could also be polypropylene, polybutylene, and copolymers of α-olefins, as well as chlorinated polyolefins. The invention is also applicable to other polymers, such as polyamides, polyvinyl chloride, polystyrene, polyethylene vinyl acetate, and polyethylene vinyl alcohol. The polymer solution typically contains about 1 to about 65% by weight polymer and is often a 40 wt % solution. It is necessary that the additive and the dispersant be mixed in a dispersion composition with a non-polar solvent rather than added directly to the polymer solution in order to insure that the dispersant contacts all the additive. The dispersion composition is added to the polymer solution in a proportion such that the ratio of additive in the dispersion composition to polymer in the polymer solution is about 0.001 to about 2% by weight.

A suitable non-polar solvent for use in the polymerization zone of a solution process must dissolve both the monomer and the polymer. Preferred non-polar solvents are branched or unbranched hydrocarbons; the preferred solvent is "hexanes," a distillation cut containing mixtures of hydrocarbons such as hexane, methyl hexane, pentane, heptane, cyclohexane, methyl cyclohexane, etc. Other solvents that can be used include octane, heptane and cyclohexane. Generally, the solvent constitutes about 30 to about 90% by weight of the total composition weight in the polymerization zone. The use of less solvent may result in the precipitation of components of the composition, and a higher percentage of solvent is unnecessary and adds to the evaporation expense of the process. It is preferable to use the same solvent to form the dispersion composition that is used to dissolve the polymer, but that is not a requirement because the solvents can be separated when they are evaporated. For example, hexane can be used for the polymer solution and octene can be used for the dispersion composition.

The process of this invention is applicable to solid additives that are insoluble in the solvent but are nevertheless sufficiently softened by the solvent so that they become sticky and tend to agglomerate or stick to the equipment. Some ultraviolet light stabilizers meet this criteria. Generally, additives having these properties are polymeric and have a polar backbone. A preferred additive, which is used to stabilize the polymer against ultraviolet light, has the Chemical Abstract name of butanedioic acid, dimethyl ester, polymer with 4-hydroxy-2,2,6,6-tetramethyl-1-piperidine ethanol; it has an average molecular weight greater than 2500 and is sold by Ciba-Geigy under the trade name Tinuvin® 622. Examples of other sticky additives that can be used in the process of this invention include N,N'-bis(2,2,6,6-tetramethyl-4-piperidinyl) -1,6-hexanediamine, polymer with 2,4,6-trichloro-1,3,5-triazine and 2,4,4-trimethyl-1,2-pentaneamine (Chemical Abstracts number 70624-18-9), sold by Ciba-Geigy under the trademark Chimassorb®944, and poly((6-morpholino-s-triazine-2,4-diyl) (2,2,6,6-tetramethyl-4-piperidyl)imino)hexamethylene((2,2,6,6-tetramethyl-4-piperdyl)imino)), (Chemical Abstracts number 82451-48-7), sold by American Cyanamid as Cyasorb ®3346. Generally, the additive constitutes about 0.5 to about 40 wt % of the dispersion composition weight as less additive may be soluble, in which case the process of this invention is unnecessary, and higher concentrations make it difficult to completely coat the additive with dispersant.

The dispersant is a solid infusible compound that is highly insoluble in the solvent at the temperature of the dispersion, typically 0° to 100° C. (The temperature of the polymer solution is between 150° and 300° C., but this is not critical.) Inorganic dispersants are preferred because of their low solubility in hydrocarbon solvents. The dispersant should also be nonreactive with the other components of the composition. The dispersant should preferably have a relatively small particle size, i.e., about 0.07 to about 1000 microns, to improve the uniformity of the coating on the additive. The preferred dispersant is a precipitated grade of calcium stearate, as it is very effective. Other suitable dispersants include zinc stearate, calcium carbonate, hydrotalcite (aluminum magnesium hydroxycarbonate), and titanium dioxide. The weight ratio of tacky additive to dispersant should be sufficient to prevent the additive from agglomerating. Additive particles that are covered with dispersant particles will not agglomerate. For a precipitated grade of calcium stearate, that ratio should not exceed about 35, as at higher ratios the dispersant may not be effective in preventing agglomeration of the additive. Ratios for other additives and dispersants are similar or lower. A ratio of less than 0.01 is usually unnecessary as most dispersants are effective in lower amounts.

The dispersant is preferably not coated with an organic coating as the coating may interfere with its performance. Tests of coated grades of hydrotalcite, talc and calcium carbonate did not work as well as the uncoated grades. An organic coating does not always interfere with the process, however, as coated titanium dioxide performed well.

In some tests, the inorganic dispersants, especially calcium carbonate, had a tendency to stick to the glass walls of the reactor. If this occurred, the tacky additive would agglomerate because insufficient dispersant was in the solution. This problem can be solved by first reacting the glass with a silane to make the glass nonreactive.

In addition to the non-polar solvent, the tacky additive and the dispersant, the dispersion composition can also contain other components such as, for example, an antioxidant. A particularly preferred antioxidant is tetrakis(methylene (3,5-di-tert-butyl-4-hydroxyhydrocinnamate)) methane (Chemical Abstracts number 6683-19-8), sold as Irganox®1010 by Ciba-Geigy. If the solubility of that antioxidant is low in the particular solvent being used it also functions as a dispersant. However, at higher temperatures (about 55° C.) this antioxidant begins to dissolve in hexane and it is no longer effective as a dispersant.

While the additive and the dispersant can be mixed together and then added to the non-polar solvent, in most cases this is not practical and it is preferable to add them each to the solvent. However, the dispersant must be added to the solvent prior to the addition of the tacky additive. Otherwise the dispersant is ineffective in preventing the agglomeration of the additive. The dispersion composition should have a temperature of about 0° to about 100° C. and preferably about 20° to about 50° C., when it is prepared and added to the polymer solution. The amount of dispersion composition added to the polymer solution should be such that the additive weight is about 0.001 to about 2% of the polymer weight. The invention can be used in the production of polymer, but it is not limited to this area.

The following examples further illustrate this invention.

EXAMPLE 1

Dispersion compositions were prepared by adding a dispersant, then a tacky adhesive additive to 300 mls of ambient temperature hexane. In order to determine any temperature limits the composition was heated to 65° C. or until gellation occurred. The following table gives the particular additives and dispersants tested, the amounts used, and the results. Any variations from this procedure are noted on the table.

| Dispersant | Additive | Results |
| --- | --- | --- |
| None | Tinuvin 622 (40 g) | Additive stuck to vessel at all tested temperatures (25° C. and above) |
| Hydrotalcite (7.5 g) | Tinuvin 622 (40 g) | Good suspension (25 to 65° C.) |
| Hydrotalcite (2.5 g) | Tinuvin 622 (40 g) | Good suspension (25 to 65° C.) |
| Calcium Carbonate (7.5 g)$^{h,g}$ (Coated) | Tinuvin 622 (40 g) | Agglomerated to from single lump in vessel. (25 to 65° C.) |
| Calcium Carbonate (7.5 g)$^f$ (Uncoated) | Tinuvin 622 (40 g) | Good suspension (25 to 65° C.) |
| Calcium Carbonate (2.5 g)$^f$ (Uncoated) | Tinuvin 622 (40 g) | Good suspension (25 to 65° C.) |
| Calcium Stearate (2.5 g) | Tinuvin 622 (40 g) | Good suspension$^a$ (25 to 65° C.) |
| Calcium Stearate (1.5 g) | Tinuvin 622 (48 g) (added before calcium stearate) | Additive stuck to vessel. (25 to 65° C.) |
| Calcium Stearate (1.5 g) | Tinuvin 622 (48 g) | Good suspension$^a$ (25 to 65° C.) |
| Calcium Stearate (0.25 g) | Tinuvin 622 (48 g) | Formed crusty mixture at 25° C. Gelled as temperature was increased to 55° C. |
| Irganox ®1010 (28 g)$^d$ | Tinuvin 622 (48 g) | Good suspension at 25° C. Gelled as 65° C. |
| None | Irgafos ®168 —(64 g)$^b$ Tinuvin 622 (48 g) | Crusty suspension at 25° C. Gelled as temperature was increased.$^c$ |
| Calcium Stearate (1.5 g) | Irgafos 168 (32 g) Tinuvin 622 (48 g) | Good, but thick suspension (25 to 65° C.) |
| Irganox 1010 (32 g)$^d$ | Irgafos 168 (32 g) Tinuvin 622 (54 g) | Good, but thick suspension (25 to 65° C.) |
| Calcium Stearate (2.5 g) | Irganox 1010 (32 g) | Good, but thick suspension (25 to |

-continued

| Dispersant | Additive | Results |
|---|---|---|
| | Irgafos 168 (32 g) | 65° C.) |
| | Tinuvin 622 (54 g) | |
| Irganox 1010[e] | Tinuvin 622 (54 g) | Good suspension at 25° C., but mixture gelled at 55°0 C. |
| | (256 mls of Cyclohexane used as solvent) | |

[a]This suspension had very good consistency.
[b]Irgafos 168 is soluble in hexane at 25° C. at concentrations as high as 10%
[c]Particles aggolmerated slightly to from a crusty mixture that could be broken up with a spatula. This agglomerate may have been caused wehn some of the coating dissolved off of Tinuvin 622 particles. Irganox 1010 is soluble at the higher temperatures.
[d]Between 55° C. and 70° C., the solubility of Irganox 1010 increases rapidly in "hexanes".
[e]At 55° C., Irganox 1010 component will dissolve in cyclohexane at concentrations up to 10%.
[f]Solid by Pfizer as "Multiflex" which is uncoated.
[g]Failure believed to be due to coating on particles.
[h]Sold by Pfizer as "Superflex" which is a coated powder.

The above table shows that a minimum amount of a dispersant is required, that the dispersant must be added before the additive, that calcium stearate performed well, and that a coated dispersant may not perform well.

EXAMPLE 2

Various amounts of different dispersants were added to 75 mls of ambient temperature "hexanes," followed by 10 gms of Tinuvin 622. The following table gives the results. A dispersant failed if the Tinuvin 622 coalesced to form lumps.

| Dispersant | Amount | Result |
|---|---|---|
| None | 0.60 g | Failed |
| CaSt Powder | 0.60 g | Passed |
| CaSt Powder (@ 0° C.) | 0.60 g | Passed |
| CaSt Granular Product | 0.60 g | Passed |
| Zinc Stearate Powder[a] | 0.60 g | Passed |
| Zinc Stearate Granular Product | 0.60 g | Passed |
| Multiflex Calcium Carbonate (0.07 micron/uncoated)[c] | 0.60 g | Passed |
| Superflex 100 Calcium Carbonate (0.7 micron/coated)[a,c] | 0.60 g | Borderline |
| Superflex 200 Calcium Carbonate (0.7 micron/coated)[a,c] | 0.60 g | Borderline |
| Superflex 200 Calcium Carbonate (0.7 micron/coated)[a,c] | 1.80 g | Borderline |
| Ultraflex Calcium carbonate (0.07 micron/coated)[a,c] | 0.60 g | Borderline |
| Albaglos Calcium carbonate (0.7 micron/uncoated)[a,c] | 0.60 g | Passed |
| L55R Hydrotalcite (coated)[d] | 0.60 g | Failed |
| L55R Hydrotalcite (uncoated)[d] | 0.60 g | Passed |
| Microtuff Talc (coated)[c] | 0.60 g | Failed |
| MP12-50 Talc (coated)[c] | 0.60 g | Passed |
| Stearic Acid[b] | 0.60 g | Failed |
| R 101 Titanium Dioxide[e,a] | 0.60 g | Passed |
| R 960 Titanium Dioxide[e,a] | 0.60 g | Passed |

[a]Dispersant initially stuck to walls. Process worked once glass walls were treated with silanes.
[b]Dispersant dissolved.
[c]Sold by Pfizer.
[d]Sold by Reheis.
[e]Sold by duPont.

The table shows that a dispersant is required and that coated dispersants performed poorly.

EXAMPLE 3

Dispersion compositions were prepared by adding calcium stearate powder (CaSt Powder) to 75 mls ambient temperature "hexanes," followed by Tinuvin 622. The following table gives the amounts used and the results.

| CaSt Powder | Tinuvin 622 | Result |
|---|---|---|
| 0.60 g | 10 g (17%) | Passed |
| 0.60 g | 0.60 g (1%) | Passed |
| 0.60 g | 5.5 g (10%) | Passed |
| 0.60 g | 22 g (30%) | Passed |
| 0.60 g | 34 g (40%) | Failed |
| 1.20 g | 34 g (40%) | Passed |
| 0.30 g | 10 g (17%) | Passed |
| 15 g | 10 g (17%) | Passed |

The first test in the above table was repeated three times, first with acetone instead of hexane. That test failed because the mixture solidified. When the test was repeated with mineral oil (viscosity of 67 centipoise at 38° C.) it was successful. When the test was repeated with hexane, using pre-blend of calcium stearate and Tinuvin 622, it was successful. These tests show that a minimum amount of dispersant is required and that acetone is not a suitable solvent.

I claim:

1. A method of dispersing a tacky insoluble additive in a solution of a polymer in a first non-polar solvent comprising
   (1) preparing a dispersion which comprises
      (a) said additive,
      (b) a second non-polar solvent in which said additive is insoluble, and
      (c) an insoluble infusible non-reactive dispersant, where said additive is added to said second non-polar solvent only after or together with said dispersant, and
   (2) adding said dispersion to said solution.

2. A method according to claim 1 wherein said tacky insoluble additive is butanedioic acid, dimethyl ester, polymer with 4-hydroxy-2,2,6,6-tetramethyl-1-piperidine ethanol.

3. A method according to claim 1 wherein said insoluble infusible non-reactant dispersant is calcium stearate.

4. A method according to claim 1 wherein said first and second non-polar solvents are aliphatic hydrocarbons.

5. A method according to claim 4 wherein said aliphatic hydrocarbon is hexanes.

6. A method according to claim 1 wherein said first non-polar solvent is the same as said second non-polar solvent.

7. A method according to claim 1 wherein said polymer is a polyalphaolefin.

8. A method according to claim 7 wherein said polyalphaolefin is polyethylene.

9. A method according to claim 1 wherein said additive and said dispersant are mixed together, and the mixture is added to said second non-polar solvent.

10. A method according to claim 1 wherein the weight ratio of said additive to said dispersant is about 0.01 to about 35.

11. A method according to claim 1 wherein the amount of said dispersion composition added to said polymer solution is such that the weight of said additive is about 0.001 to about 2% of the weight of said polymer.

12. A method of adding a tacky additive to a solution of polyethylene in an aliphatic hydrocarbon solvent comprising performing the following steps in the order given:
(A) forming a slurry of the same aliphatic hydrocarbon solvent and an insoluble infusible non-reactive dispersant;
(B) adding said tacky additive to said slurry; and
(C) adding said slurry to said polyethylene solution.

13. A method according to claim 12 wherein said sticky insoluble additive is butanedioic acid, dimethyl ester, polymer with 4-hydroxy-2,2,6,6-tetramethyl-1-piperidine ethanol.

14. A method according to claim 12 wherein said insoluble infusible non-reactant dispersant is calcium stearate.

15. A method according to claim 12 wherein said aliphatic hydrocarbon is hexanes.

16. A method according to claim 12 wherein calcium stearate is said dispersant and the weight ratio of said additive to said dispersant is about 0.01 to about 35.

17. A method according to claim 12 wherein the amount of said dispersion composition added to said polyethylene solution is such that the weight of said additive is about 0.001 to about 2% of the weight of said polyethylene.

18. A solution of polyethylene containing a dispersion composition made by
(A) forming a slurry of a non-polar solvent and an insoluble infusible non-reactive dispersant; and
(B) adding to said slurry a tacky additive.

19. A solution according to claim 18 wherein said insoluble infusible non-reactive dispersant is calcium stearate.

20. A solution according to claim 18 wherein said non-polar solvent is an aliphatic hydrocarbon.

* * * * *